(12) United States Patent
De Marchi

(10) Patent No.: US 6,561,699 B1
(45) Date of Patent: May 13, 2003

(54) PLUG PART FOR AN OPTICAL PLUG-AND-SOCKET CONNECTION

(75) Inventor: Silverio De Marchi, Ascona (CH)

(73) Assignee: Diamond S.A., Losone (CH)

( * ) Notice: Subject to any disclaimer, the term of this patent is extended or adjusted under 35 U.S.C. 154(b) by 79 days.

(21) Appl. No.: 09/618,835

(22) Filed: Jul. 18, 2000

(30) Foreign Application Priority Data

Jul. 26, 1999 (EP) .............................................. 99810667
Jun. 15, 2000 (EP) .............................................. 00810519

(51) Int. Cl.[7] ................................................. G02B 6/38
(52) U.S. Cl. ......................... 385/58; 439/353; 439/358
(58) Field of Search ............................ 385/58; 439/353, 439/358, 352

(56) References Cited

U.S. PATENT DOCUMENTS

| 4,737,008 A | | 4/1988 | Ohyama et al. ............ 350/96.2 |
|---|---|---|---|
| 4,759,599 A | | 7/1988 | Yamaguchi et al. ...... 350/96.21 |
| 4,873,614 A | | 10/1989 | Lichtensperger ............ 361/394 |
| 5,154,629 A | | 10/1992 | Carver et al. ................ 439/352 |
| 5,845,036 A | * | 12/1998 | De Marchi ................. 385/139 |
| 5,956,444 A | * | 9/1999 | Duda et al. ................... 385/58 |
| 6,146,179 A | * | 11/2000 | Denny et al. ............... 439/352 |
| 6,149,451 A | * | 11/2000 | Weber ......................... 439/358 |
| 6,371,788 B1 | * | 4/2002 | Bowling et al. ............ 439/358 |

FOREIGN PATENT DOCUMENTS

| EP | 0 823 649 A1 | 11/1998 |
|---|---|---|
| WO | 98/53347 | 11/1998 |

* cited by examiner

Primary Examiner—Lynn D. Feild
Assistant Examiner—Javaid Nasri
(74) Attorney, Agent, or Firm—Shoemaker and Mattare

(57) ABSTRACT

For the pull-proof locking of a plug part (1) into a socket part there is provided a locking element (27) which on a rotational link (39) is pivotably fastened on a plug part and which is resiliently supported on the plug housing. The locking element is advantageously snapped onto the plug housing and is formed of a bending part of metal.

18 Claims, 10 Drawing Sheets

PLUG PART FOR AN OPTICAL PLUG-AND-SOCKET CONNECTION

FIELD OF THE INVENTION

This invention relates to a plug part for an optical plug-and-socket connection.

BACKGROUND OF THE INVENTION

In contrast to electrical plug-and socket connections, with optical plug-and-socket connections the exact fitting position of the plug pin plays an important role in the quality of the transmission performance. The lock element thus has the job of locking the plug part in the socket part in a pull-proof manner. The locking is effected, as a rule, automatically on reaching the final insert position. When pulling out the plug part a manual unlocking movement must be carried out.

With comparable plug parts, the locking element as a rule is formed as one piece with the plug housing. It has the shape of a lever which via a bending link is resiliently connected to the housing and on whose end detent pawls or other locking elements are arranged. One example for such a plug part is shown and described in international publication WO 98/53347. One disadvantage of this design, however, lies in the fact that the plug housing must be manufactured as a complicated injection molded part. The bending link may become weaker with time so that the locking element may no longer carry out is function. Furthermore, a plastic material with suitable bending properties is not necessarily well suited for the plug housing.

There are already known other plug parts with which locking elements may be applied as separate components. Thus U.S. Pat. No. 4,759,599 shows an optical plug which, for locking with a socket part, is provided with a locking mechanism which opens in a jaw-like manner and which is spring-biased. This mechanism consists of a lever pair which is pivotably mounted on axes, wherein a torsion spring engages on each lever. This construction type is relatively complicated and for unlocking the plug part both individual levers must be uniformly actuated. With a high packing density of the plug, this for reasons of space is no longer possible. Similar locking mechanisms with mutually opening lever pairs are disclosed also in U.S. Pat. No. 4,737,008 and in U.S. Pat. No. 5,154,629.

SUMMARY OF THE INVENTION

It is therefore the object of the invention to provide a plug part of the initially mentioned type which is provided with a locking element that is easy to manufacture and which functions well. The locking element should furthermore also be able to be well operated and the handling of the plug part should not be inhibited by projecting parts and the like. These objects are achieved according to the invention with a plug part as described below.

The locking element, fastened to a rotational link pivotably on the plug part, is resiliently supported on the plug housing. A resilient connection per se via a bending link is therefore not necessary. The locking element may in this manner be formed as a one-piece bent part of metal. Even after numerous actuations appearances of wear do not occur.

Advantageously, the locking element is snapped onto the plug housing by which means the assembly or the replacement of a locking element may be considerably simplified. A particularly advantageous snap connection is achieved by way of the fact that the plug housing comprises a pair of link cams and that the locking element comprises a pair of corresponding recesses into which the link cams engage. Conceivably, it could also be fastened by way of a separate pivot or the like.

One advantageous resiliency system of the locking element may be achieved when it comprises a leaf spring whose one end rests on the plug housing in such a manner that the leaf spring biases the locking element into a locking position. The locking element is advantageously design such that it comprises two roughly parallel arms and a grip piece which connects the arms and on which the leaf spring is arranged. The two arms are arranged laterally from the plug housing.

The leaf spring may be easily integrated on the bent part of metal and such bent parts may be easily manufactured in large numbers. On the free ends of the arms detent pawls in the form of bends may be arranged. The detent pawls run at an acute angle to the longitudinal middle axis of the plug part an in this manner form ramps on which the arms are pivotable against a spring force on insertion into a socket part.

In certain cases it is also useful for reasons of space when the arms on pivoting the locking element against the spring bias at least partly sink into corresponding recesses in the plug housing.

The locking element is advantageously linked onto the cable-side end of the plug part. In this manner it may be easily actuated with the thumbs on the grip piece. A linking onto the plug end-face side of the plug part would, however, also be conceivable.

An optical plug-and-socket connection is with the help of the described plug part manufactured together with a socket part which comprises at least one socket for receiving the plug pin, wherein the locking element on reaching the final insertion position engages into at least one undercut on the socket part. Thus without further ado it is possible for the plug part according to the invention to be combined with a conventional socket part.

A particular advantage may be achieved when the socket part comprises a surface section which lies over the insert opening and which, with a surface section on the locking element, encloses an obtuse angle, whereby the surface sections connect to one another essentially continuously. With the surface section on the locking element, this is so preferably for the grip piece. With this arrangement, no sort of hook-like projections arise on which the relatively thin fiber-optic cable may get snagged.

The socket part is particularly advantageously composed of two equal housing halves which between themselves accommodate the actual socket. On such a socket part the undercuts required for the locking element may also be manufactured particularly simply with regard to molding technology.

Further advantages result when at least one insert opening of the socket part is provided with a pivotable protective flap which is linked on by way of a pivot passing through the socket housing and the protective flap. As with the plug part, the protective flap also on the socket part prevents the exiting of laser light. The linking by way of a pivot is also possible with difficult space conditions and ensures a secure connection between the protective flap and the housing. The protective flap may thus be biased by way of a spring which is seated on the pivot. The spring is advantageously a helical torsion spring.

A particularly simple securement with respect to the relative position between the protective flap, spring and pivot may be achieved when the pivot comprises a circumferential groove and when the protective flap is provided with a spur which for the lateral fixation of the pivot engages into the groove.

Also the protective flap may advantageously be designed as a bent metal part.

On the socket part on both sides of the insert opening two undercuts for the locking element in the form of cams may be arranged, wherein the protective flap with a removed plug part bears on the cams. The cams fulfil in this manner a double function as limiting elements for the protective flap being under spring bias and as a counter bearing for the locking element.

Individual previously mentioned features on the socket part may also be realized in combination with conventional plug parts. This in particular concerns the two part housing design and/or the design of the protective flaps.

BRIEF DESCRIPTION OF THE DRAWINGS

Examples of the invention are shown in the drawings and are hereinafter described in more detail.

DESCRIPTION OF THE PREFERRED EMBODIMENTS

Figure 1:
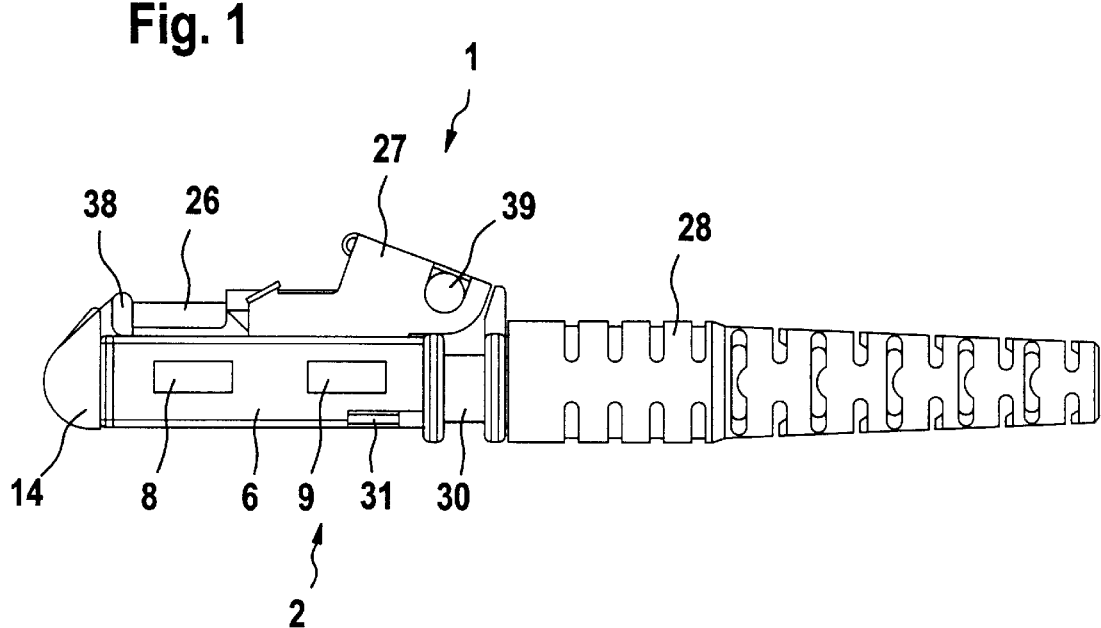
FIG. 1 is a lateral view of a plug part with the features of the invention.
Figure 2:
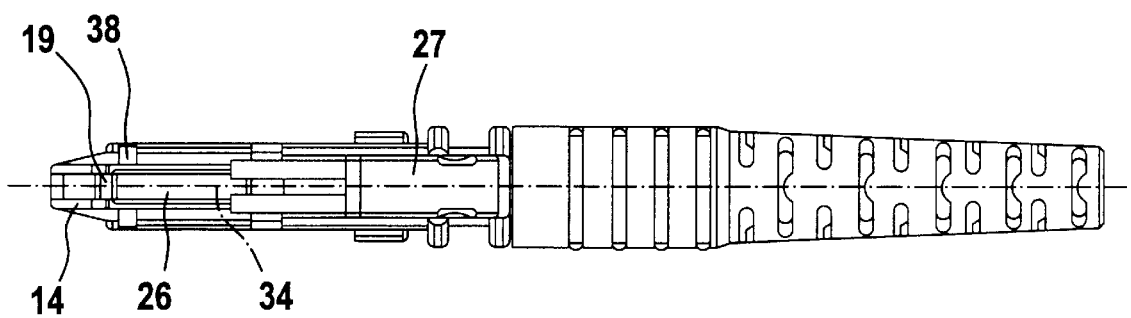
FIG. 2 is a plan view of the plug part according to FIG. 1.
Figure 3:
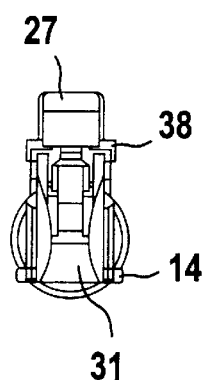
FIG. 3 is a view of the end side of the plug part according to FIG. 1.

As is shown in the FIGS. 1 to 4, the plug part 1 consists essentially of a plug housing 2 which is divided into a plug end-side housing part 4 and a cable-side housing part 5. The plug housing contains a plug pin 3 which is resiliently mounted in the direction of the longitudinal middle axis 34. Of course it would also be conceivable for several plug pins to be held in the same plug housing.

The plug pin 3 is fixed in a pin mounting 29 which on the opposite side accommodates the optic cable. This, however, for reasons of a better overview, is not shown here. A flexible cable bend protection 28 in the known manner limits the permitted bending radius on the cable. On the pin mounting 29 there is mounted a helical compression spring 11 which on the one side is supported on the cable-side housing part and on the other side on the polygonally formed head end 35 of the pin mounting.

Both housing parts 4 and 5 are held together with the help of a bow 6 which roughly is U-shaped. In both U-limbs, in each case, there are arranged two rectangular reliefs 7a, 7b. These in each case engage over a corresponding raised part 8, 9 on the two lateral walls of the housing part 4 on the side of the plug end-face and the housing part 5 on the cable side respectively.

The two housing parts are designed such that the contact surfaces bearing on one another simultaneously form a securement against rotation. Thus the housing part 4 is provided with a securement lug 12 which tapers in a wedge matter, engages into a corresponding recess 13 on the housing part 15 and here lightly wedges. The slight wedging effects a connection, completely free of play, between the housing parts. On the housing part 5, furthermore, there are arranged stabilizing cams 31 on which the bow 6 is additionally supported. On a neck section 30 two plug parts with the help of a clip not shown here may be combined to form a duplex plug.

Figure 6:
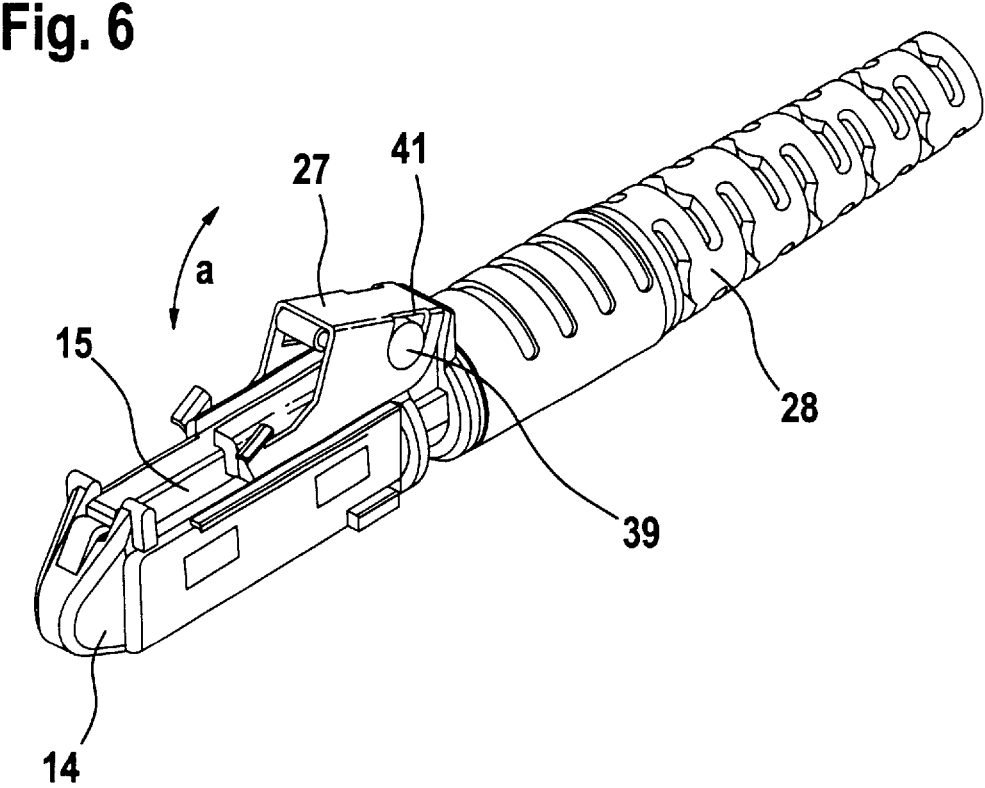
FIG. 6 is a perspective representation of the plug part according of FIG. 1.
Figure 7:
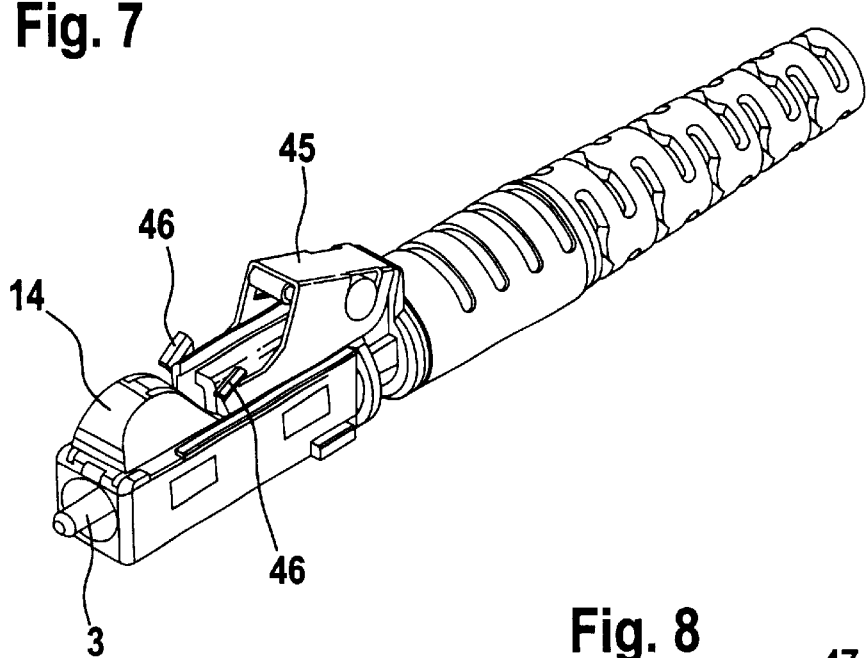
FIG. 7 shows the plug part according to FIG. 6 with an opened protective flap.

The plug end side in the uninserted condition is continuously closed with a protective flap 14. This has at its disposal a link fork 18 with link cams 17 laterally arranged thereon and pointing away from one another. These link cams are pivotably (FIG. 6) and displaceably mounted in the guide path 15. The protective flap 14, in the condition of being pivoted open by roughly 90°, may be displaced back on the upper side of the plug housing so that it takes up less space in the socket part and does not hinder the insert procedure. The complete opening position is shown in FIG. 7; however, under normal conditions, this position may only be achieved in the corresponding socket part.

The guide path 15 is on the one hand formed by in each case one surface section on the housing part 4 and by the underside of a bend 23 of the bow 6. Each U-limb 22 is with this bent so far that it sufficiently engages over the link cams 17. The protective flap 14 is biased by way of a helical compression spring 25 into the closure position. This spring is seated on a spring mandrel 32 on the housing part 4. This impinging of the protective flap is effected indirectly via a plunger 26 which partly surrounds the helical compression spring. The end-face of the plunger in each position of the protective flap contacts a lever arm 19 which projects beyond the plane of the link cams 17.

Figure 4:
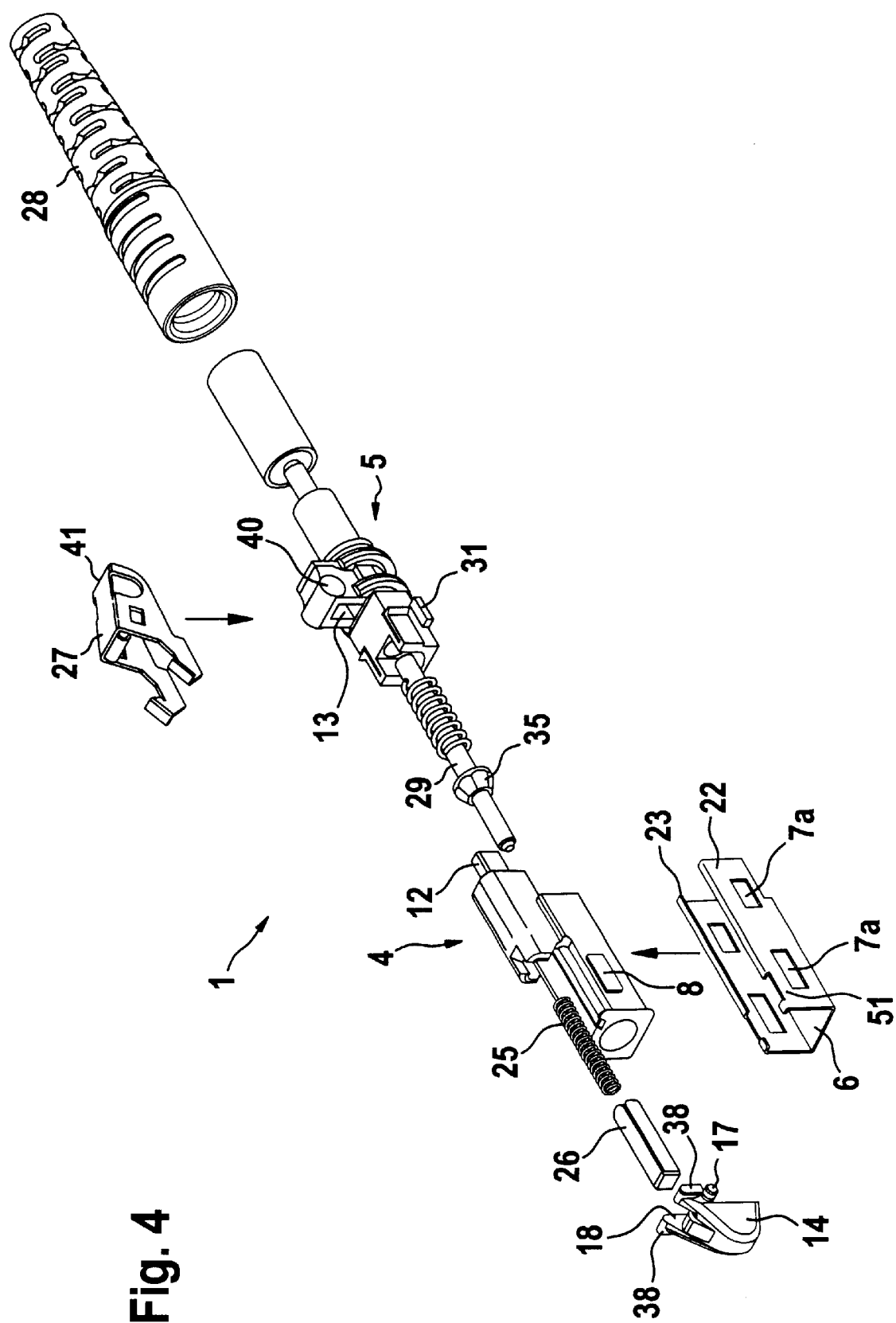
FIG. 4 is an exploded drawing of the plug part according to FIG. 1.
Figure 5:
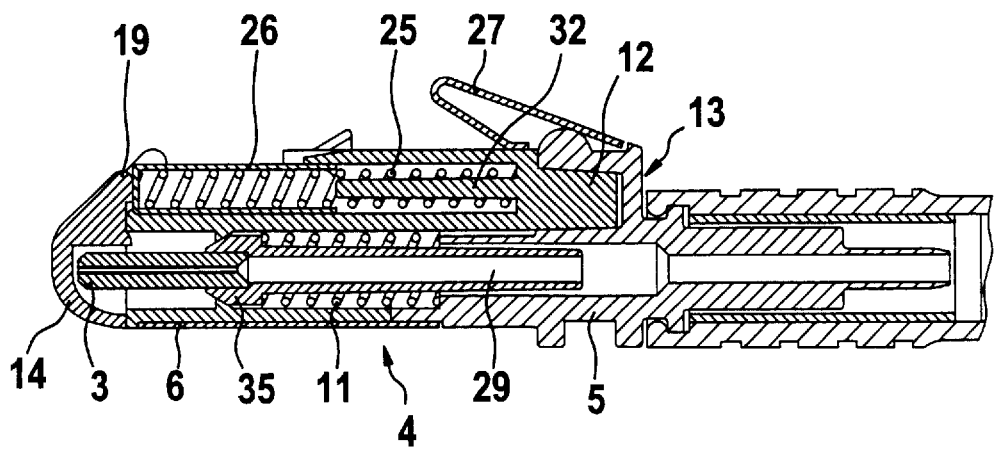
FIG. 5 is a longitudinal section through the plug part according to FIG. 1 in a somewhat enlarged representation.

The control of the protective flap 14 upon insertion into a socket part 6 (FIGS. 10a to 10d) is effected on a control cam pair 28 which likewise is arranged on the link fork 18 via the link cams 17 (FIG. 4). The socket part 16 contains the actual socket 33 which accommodates the plug pin 3 in an exactly fitting manner. In the position having been pivoted open once the protective flap 14 remains stationary relative to the socket part 16, while the plug part is further inserted. So that also the control cam pair or at least one of the control cams may enter into the guide path 15 on the bow 6, thee are provided corresponding recesses 51.

Figure 9:
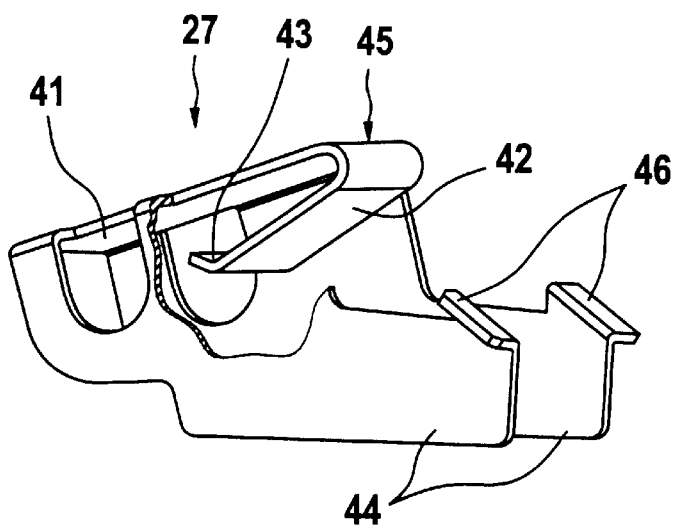
FIG. 9 is a partly cut-open perspective representation of a locking element.

The locking of the plug part in the socket part is effected with the help of a locking element 27 whose construction is shown more exactly in FIG. 9. The bent part for example of steel has at its disposal two roughly parallel, large surfaced arms 44 on whose end in each case there is arranged an outwardly directed bend 46. These bends form a detent pawl pair and they are arranged at an angle to the longitudinal middle axis 24 in a manner such that the arms 44 on inserting into the socket part 16 are pressed down against spring force.

The connection of the two arms 44 is effected via a grip piece 45 on which a leaf spring 42 is arranged. The leaf spring extends downwards between the two arms 44 and its end 43 is formed such that it may slidingly cooperate with the surface of the plug housing.

In the arms 44 there are arranged lateral reliefs 41. These engage over the lateral link cams 40 on the plug part 5. The link cams 40 are in the upper half somewhat beveled by which means the snapping-on of the locking element 27 is simplified. In this manner a rotational link 39 is formed, about which the locking element 27 is pivotable in the arrow direction a against the force of the leaf spring 42. On pressing down the locking element simultaneously the two arms 44 sink into the guide path 15. The U-shaped bow 6 in this manner serves as an additional protector and guide for the arms 44.

Figure 8:
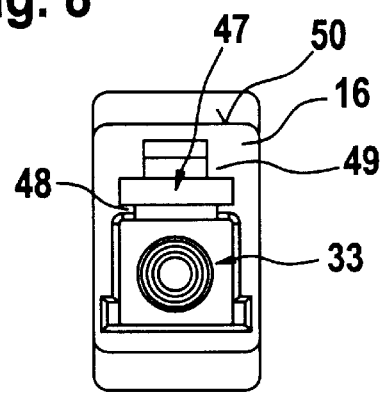
FIG. 8 is a plan view of the insert opening of a socket part.

The socket part 16 according to FIG. 8 has an insert opening 47 with a special configuration. On both lateral walls there are arranged lateral ledges 48. Directly behind the insert opening on the upper side there are formed undercuts 49 into which the detent pawls 46 of the locking element may latch.

Figure 10A:
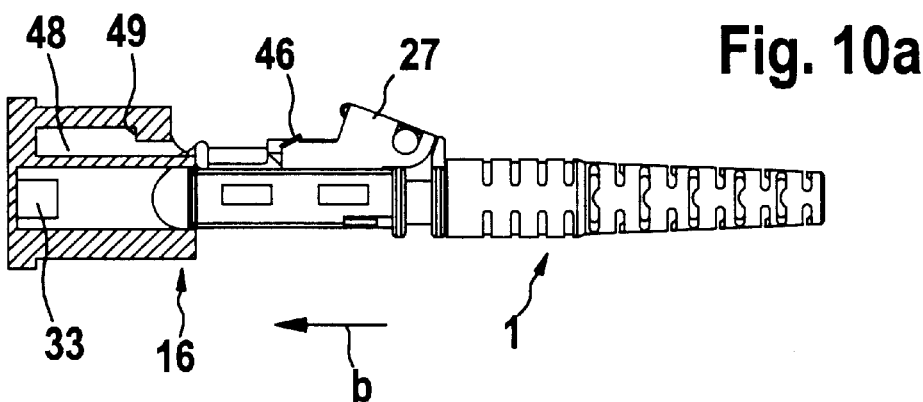
FIGS. 10a to 10d depict an insert procedure on the socket part in four various sequences.
Figure 10B:
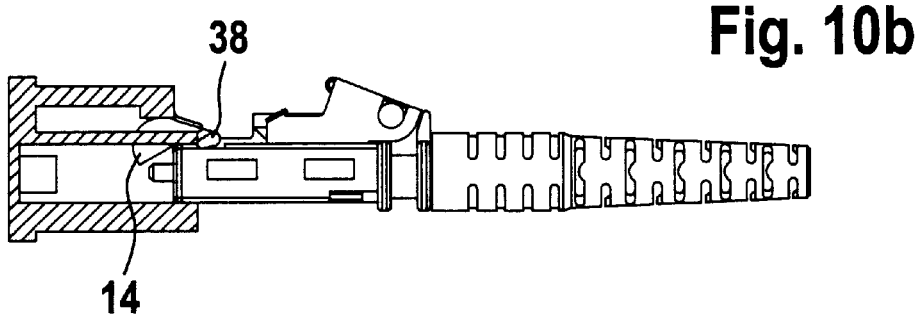
Figure 10C:
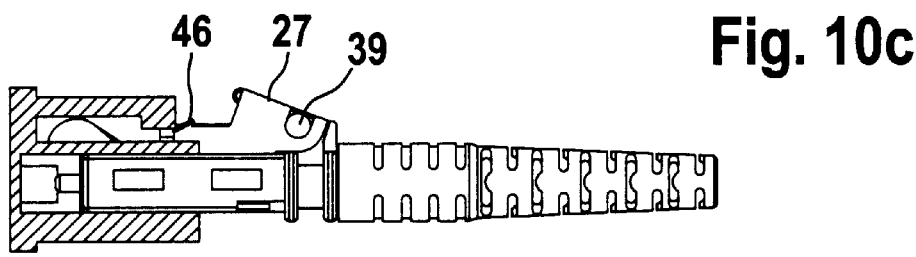
Figure 10D:
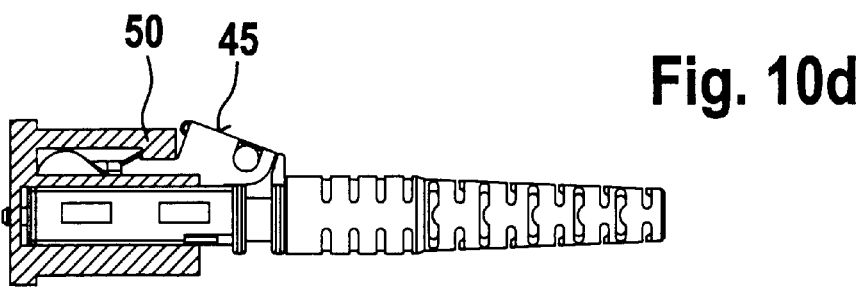

The insert procedure is represented in FIGS. 10a and 10d in detail. The plug part 1 is applied onto the socket part 16 in correct position and is pushed in the arrow direction b against the socket 33. Thus the control cams 38 are pivoted back by the lateral edges 48, and the protective flap 14 beings its opening movement. As soon as the detent pawls 46 reach the opening region of the socket part the locking element 27 is pivoted down about eh rotational link 39. As soon as the detent pawls have reached the undercut 49 under spring force they latch therein. In this position the plug part 1 has reached the final insert position.

From FIG. 10d it is evident that a surface section 50 over the insert opening 47 together with the grip piece 45 encloses an obtuse angle. The grip piece with this connects almost without transition to the surface section 50 so that no cable may get snagged.

Figure 11:
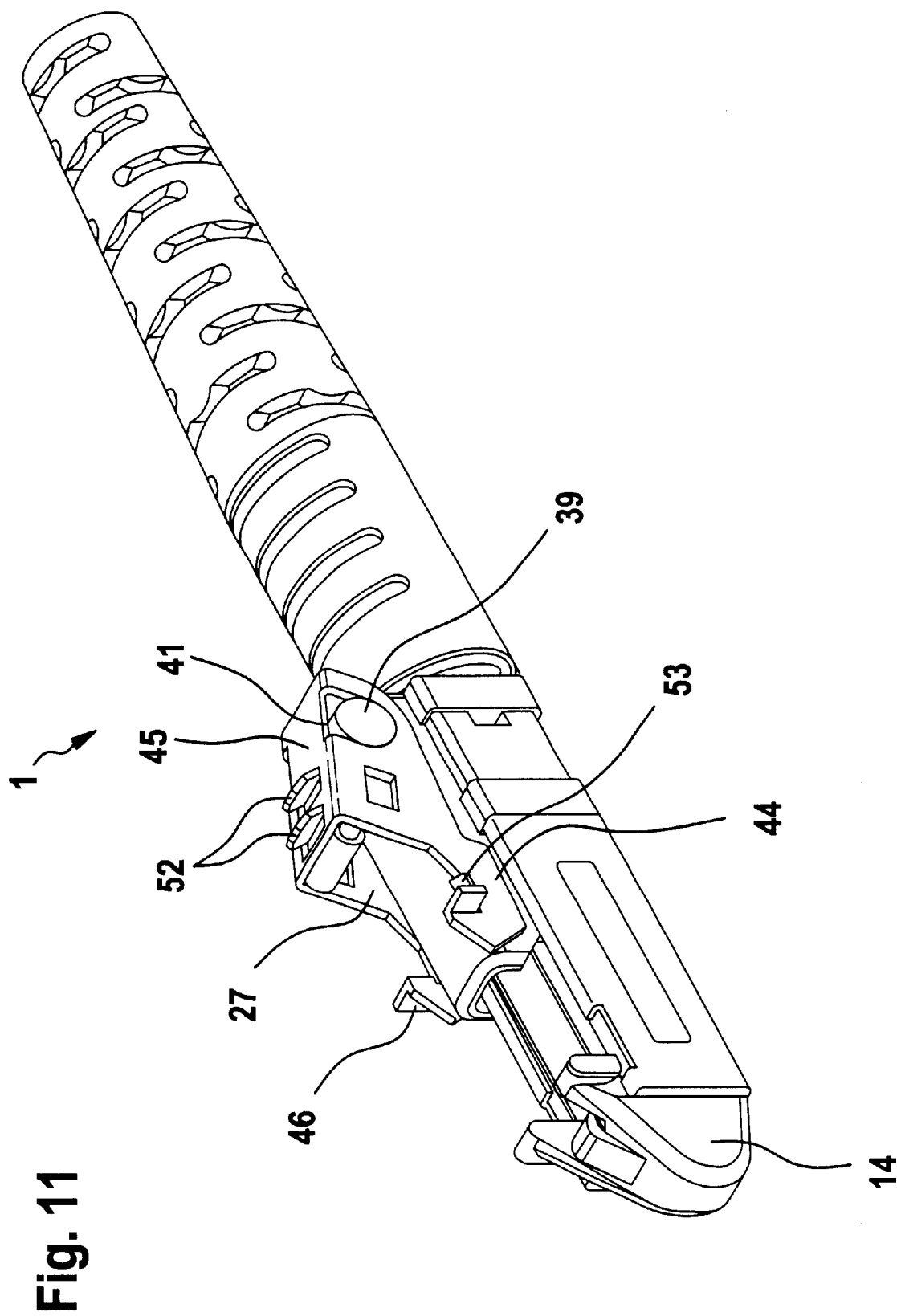
FIG. 11 is a perspective representation of an alternative plug part.
Figure 12:
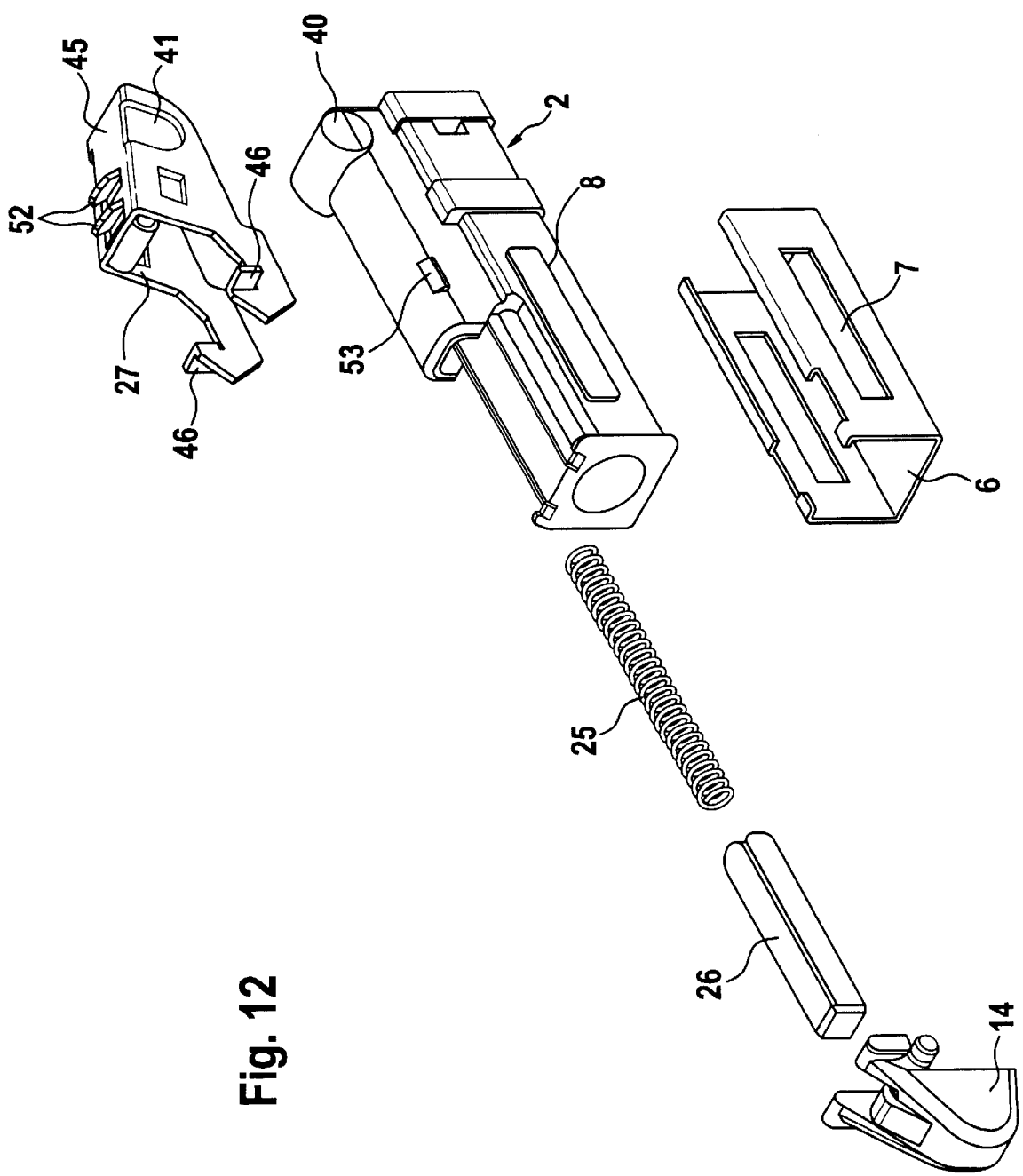
FIG. 12 is an exploded drawing of the outer plug parts of the plug part according to FIG. 11.
Figure 13:
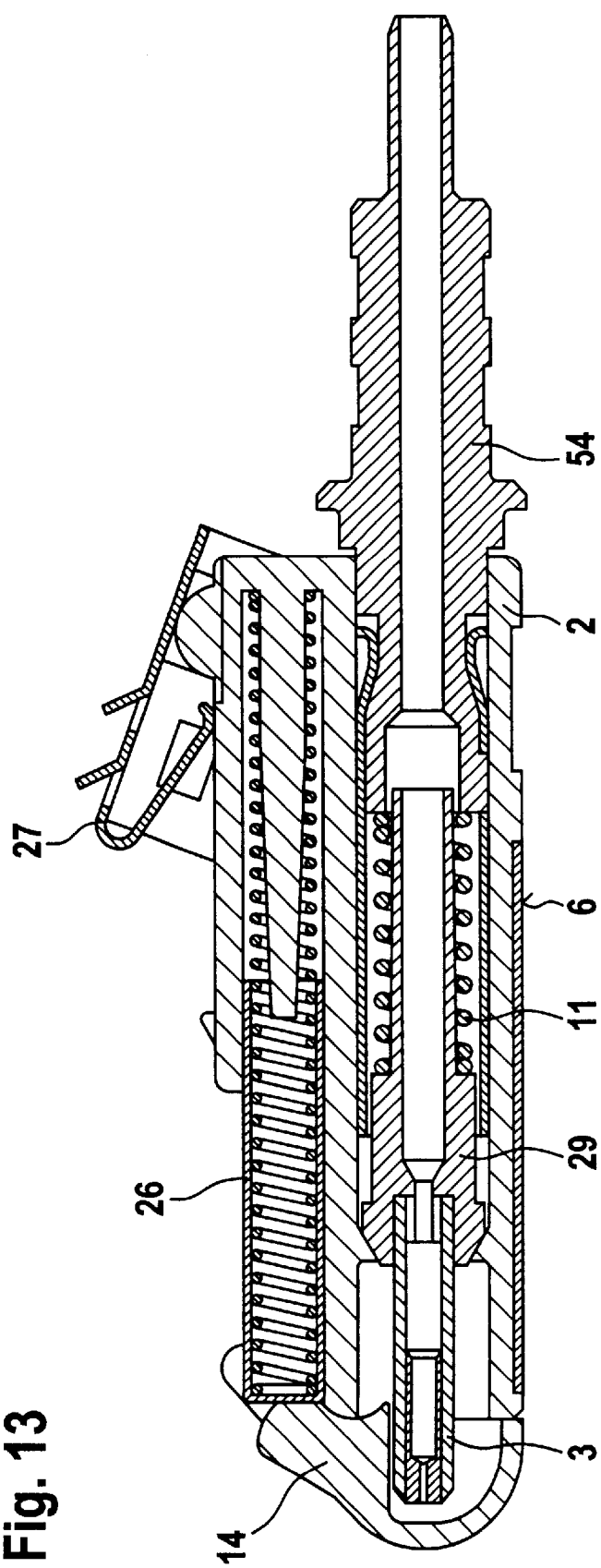
FIG. 13 is a longitudinal section through the plug part according to FIG. 11.

The plug part according to the FIGS. 11 to 13 differs from the previous embodiment primarily by the alternative construction of the plug housing and by a somewhat modified locking element. The latter has on the grip piece bent scales 52 in order to improve the gripping. Furthermore the bends on the detent pawls 46 run approximately at a right angle to the longitudinal middle axis of the plug part.

The plug housing 2 is not divided into two separate parts, but is practically formed as a mono-block housing. Accordingly the bow 6 also does not additionally have the function of a connecting element. It merely serves for forming a guide path for the protective flap 14. On the plug housing there are arranged abutments 53 which cooperate with the later arms 44 of the locking element and which limit the rest position of the locking element assumed under spring bias.

From FIG. 13 it is clear that also the mounting and fixation of the plug pin 3 on the pin mounting 29 in the plug housing is solved in a somewhat different way. The plug inner parts thus form a cable terminal unit 54 which together with the helical compression spring 11 may be preassembled and in the correct rotational position may be latched into the plug housing 2 in a positionable manner.

Figure 14:
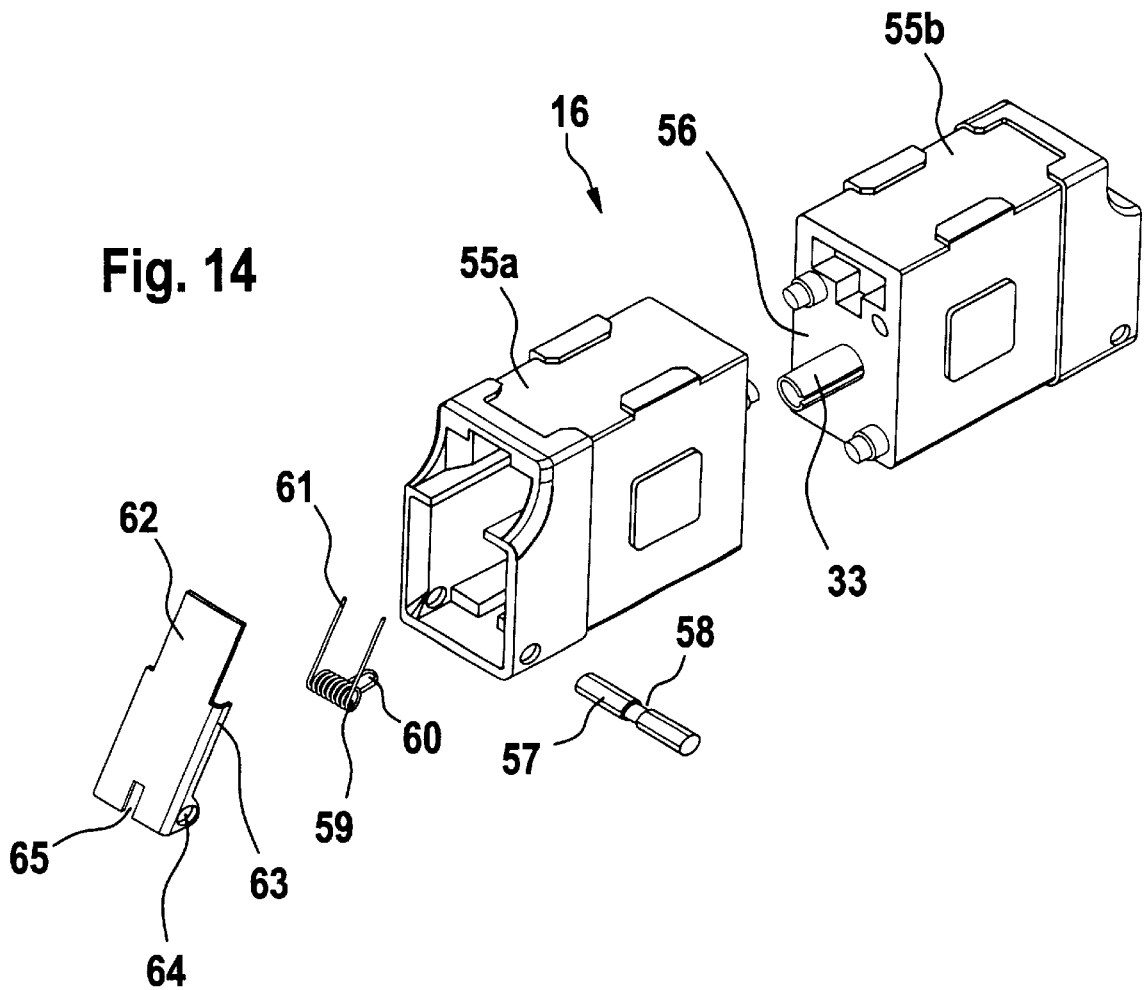
FIG. 14 is an exploded drawing of a socket part.
Figure 15:
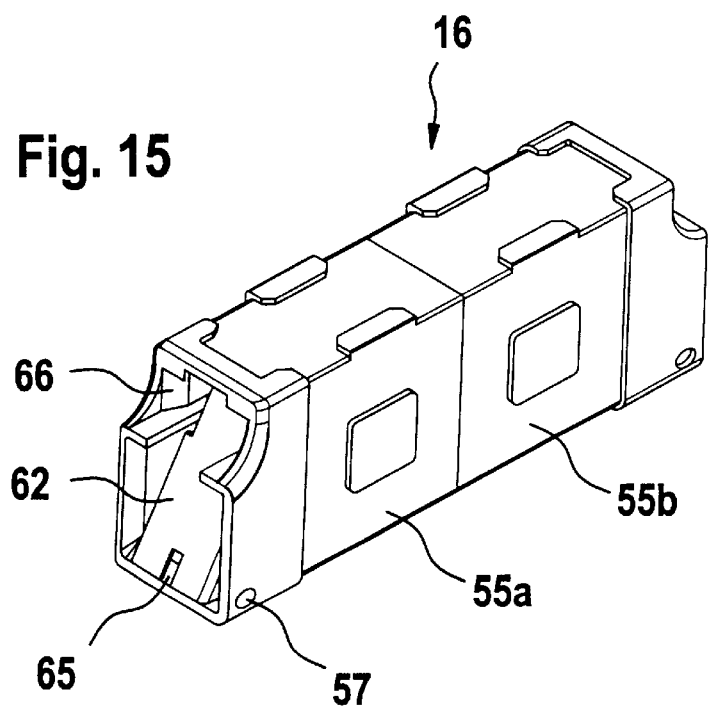
FIG. 15 is a perspective representation of the socket part according to FIG. 14 in the assembled together condition.
Figure 16:
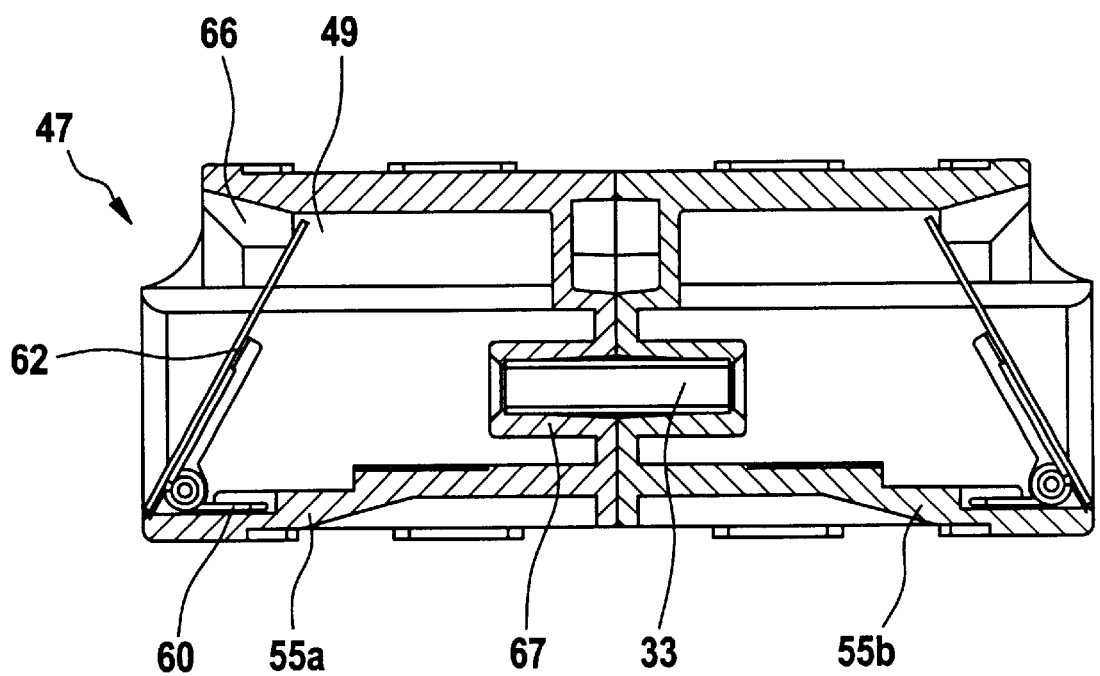
FIG. 16 is a longitudinal section of the invention according to FIG. 15.

FIGS. 14 to 16 represent a socket housing 16 more accurately. This consists of two identically formed housing halves 55a and 55b. On the inner end-face sides 56 these halves are hermaphroditically formed by way of plugs and bores in a manner such that they may be joined together and where appropriate adhesed. The actual centering socket 33 for accommodating the plug pins 3 is advantageously floatingly mounted in a socket cage 67. The housing halves are advantageously formed as injection molding parts of plastic material. The two insert openings 47 are closed with protective flaps 62 which may be pivoted open and which on insertion of the plug part bend back and release the socket 33. The protective flaps, preferably manufactured as bending parts of metal, have at their disposal lateral bends 63 on which there are arranged openings 64. The link is formed by a pivot 57 which may be inserted through corresponding bearing openings 88 on the socket part and through the openings 64 on the protective flap.

Each protective flap 62 is biased via a spring 59 into the closure position. For this the spring has spring arms 61 which are supported on the protective flap 16, and an integrated spring foot 60 which is supported in the socket part (FIG. 16). The closure position of the protective flap 62 is limited by lateral cams 66 which also form the undercut 49 for the locking element.

In order to fix the pivot 57 with respect to its lateral relative position there is a groove 58. The protective flap 62 has a spur 65 which, with an inserted pivot 57, latches into the groove 58 and thus laterally fixes the pivot. Such a protective flap on a socket part may be particularly easily assembled and could also find application in the context of conventional plug-and-socket connections.

What is claimed is:
1. A plug part (1) for an optical plug-and-socket connection, said plug part comprising
   a plug housing in which at least one plug pin (3) is held and
   at least one resilient locking element (27) for the pull-proof locking of the plug part in a socket part (16) on reaching a final insert position, wherein
   the locking element (27) is pivotably fastened on the plug part on a rotational link (39), and
   the locking element (27) is a one-piece part comprising
      a grip piece (45),
      two roughly parallel arms (44) extending in respective substantially parallel planes from opposite sides of the grip piece, said arms having free ends on which there are arranged respective detent pawls (46), and
      a spring section which is arranged on the grip piece and on which the locking element is resiliently supported on the plug housing (2).

2. A plug part according to claim 1, wherein the locking element (27) is formed as a bent component of metal.

3. A plug part according to claim 1, wherein the plug housing (2) comprises a pair of link cams (40) and the locking element (27) comprises a pair of corresponding recesses (41) into which the link cams engage.

4. A plug part according to claim 1, wherein the spring section is designed as a leaf spring (42) whose one end (43) lies on the plug housing (2) and which biases the locking element (27) into a locking position.

5. A plug part according to claim 1, wherein the detent pawls (46) are in the form of bends.

6. A plug part according to claim 1, wherein the detent pawls (46) form ramps on which the arms (44) on inserting into a socket part (16) are pivotable against the spring force.

7. A plug part according to claim 1, wherein the arms (44) on pivoting the locking element (27) against the spring bias at least partly sink into corresponding recesses (15) on the plug housing.

8. A plug part according to claim 1, wherein the locking element (27) is linked on a cable-side end of the plug part.

9. A plug part according to claim 1, wherein movement of the locking element under the spring bias is limited by at least one abutment on the plug housing.

10. An optical plug-and-socket connection having
at least one plug part (1) according to claim 2 and
a socket part (16) comprising at least one socket (33) for accommodating the plug pin (3), wherein the locking element (27) on reaching the final insert position engages into at least one undercut (49) on the socket part.

11. A plug-and-socket connection according to claim 10, wherein the socket part (16) comprises a surface section (50) which lies over an insert opening (47) and which with a surface section (45) on the locking element encloses an obtuse angle, wherein the two surface sections connect to one another essentially continuously.

12. A plug-and-socket connection according to claim 10, wherein the each of said detent pawls has a ramp-like outer side which cooperates with the insert opening (47) on the socket part in a manner such that during insertion, the locking element is pivoted against the biasing force.

13. A plug-and-socket connection according to claim 10, wherein the socket part is composed of two equal housing halves which between themselves accommodate the socket (33).

14. A plug-and-socket connection according to claim 10, wherein at least one insert opening of the socket part is closed with a pivotable protective flap which is linked on by way of a pivot passing through the socket housing and the protective flap.

15. A plug-and-socket connection according to claim 14, wherein the protective flap is biased by way of a spring which is seated on the pivot.

16. A plug-and-socket connection according to claim 14, wherein the pivot comprises a circumferential groove, and the protective flap is provided with a spur which for the lateral fixation of the pivot engages into the groove.

17. A plug-and-socket connection according to claim 14, wherein the protective flap is formed as a bent part of metal.

18. A plug-and-socket connection according to claim 14, further comprising on both sides of the insert two undercuts for the locking element in the form of cams, wherein the protective flap with a removed plug part bears on the cams.

* * * * *